United States Patent
Sheppard et al.

(10) Patent No.: US 6,183,162 B1
(45) Date of Patent: Feb. 6, 2001

(54) METHOD FOR TREATING VAPORS AND LIQUIDS RECOVERED FROM A SUBSURFACE REMEDIATION PROCESS

(75) Inventors: Douglas M. Sheppard, Seal Beach; Cornelis L. W. Overduin, Huntington Beach, both of CA (US)

(73) Assignee: Southern California Edison ( * ) Notice: Under 35 U.S.C. 154(b), the term of this patent shall be extended for 0 days.

(21) Appl. No.: 09/239,865

(22) Filed: Jan. 29, 1999

(51) Int. Cl.$^7$ .................................. B09C 1/02; B01D 3/00
(52) U.S. Cl. ......................... 405/128; 405/131; 210/741; 166/272.3; 95/257
(58) Field of Search ................................ 405/258, 303, 405/131, 130, 128; 166/272.3; 95/257, 254, 199; 422/137; 210/741

(56) References Cited

U.S. PATENT DOCUMENTS

| | | | |
|---|---|---|---|
| 4,295,864 | * 10/1981 | Rudolph et al. | 55/40 |
| 4,312,642 | * 1/1982 | Lehr et al. | 422/137 |
| 4,509,599 | 4/1985 | Chenoweth et al. | |
| 4,890,673 | 1/1990 | Payne. | |
| 4,982,788 | 1/1991 | Donnelly. | |
| 5,018,576 | * 5/1991 | Udell et al. | 166/272 |
| 5,025,862 | 6/1991 | Showalter. | |
| 5,249,888 | * 10/1993 | Braithwaite et al. | 405/128 |
| 5,265,677 | 11/1993 | Schultz. | |
| 5,312,552 | * 5/1994 | Norman | 210/741 |
| 5,335,728 | 8/1994 | Strahan. | |
| 5,375,539 | 12/1994 | Rippberger. | |
| 5,441,365 | 8/1995 | Duffney et al. | |
| 5,449,251 | * 9/1995 | Daily et al. | 405/128 |
| 5,512,084 | * 4/1996 | Mauterer | 95/199 |
| 5,681,130 | * 10/1997 | Aines et al. | 405/130 |
| 5,765,964 | * 6/1998 | Calcote et al. | 405/128 |
| 6,056,806 | * 5/2000 | Youssef | 95/254 |

FOREIGN PATENT DOCUMENTS

WO 94/20729    9/1994  (EP) .

* cited by examiner

Primary Examiner—Eileen D. Lillis
Assistant Examiner—Raymond Addie
(74) Attorney, Agent, or Firm—Sheldon & Mak; Denton L. Anderson

(57) ABSTRACT

A continuous process for removing organic contaminants from a subsurface formation. Including the steps of (a) injecting steam into the subsurface formation via an injection conduit, (b) removing a liquid stream from the subsurface formation via a liquid recovery conduit, (c) removing a vapor stream from the subsurface formation via a vapor recovery conduit, the vapor stream comprising both condensible vapors and non-condensible vapors, (d) combining the liquid stream and the vapor stream to create a combined stream and cooling the combined stream in a heat exchanger so that substantially all of the condensible vapors are condensed to condensed liquids, the condensed liquids being combined with the ground water liquid stream to form a combined liquid stream, and (e) separating the non-condensible vapors from the combined liquid stream.

10 Claims, 2 Drawing Sheets

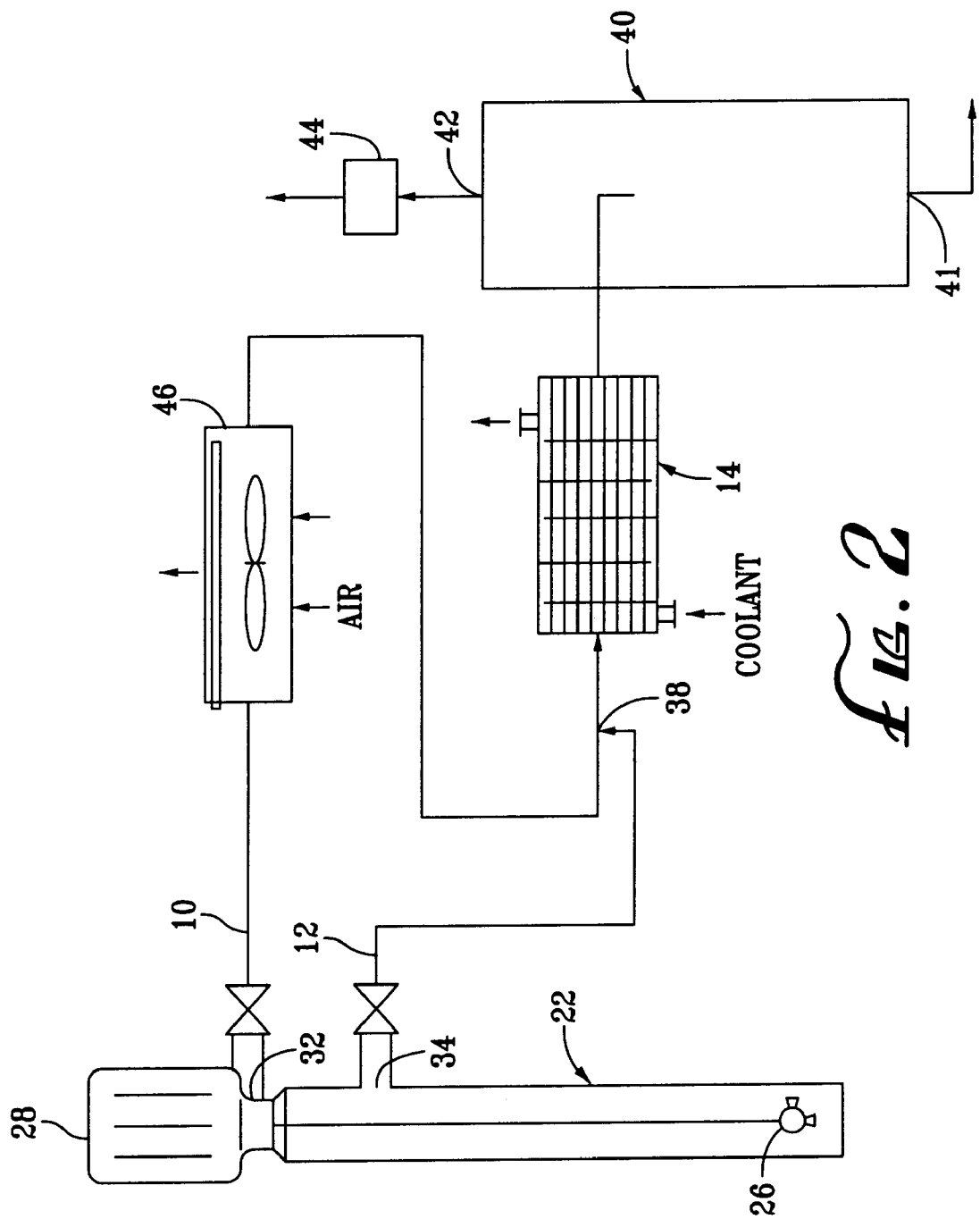

METHOD FOR TREATING VAPORS AND LIQUIDS RECOVERED FROM A SUBSURFACE REMEDIATION PROCESS

BACKGROUND OF THE INVENTION

The urgency of removing organic contaminants from subsurface formations has become increasingly more apparent during the last three decades. This urgency has spawned a tremendous effort to improve subsurface decontamination techniques.

Subsurface decontamination techniques fall into one of two broad classes, aboveground methods and in situ methods. Above-ground methods generally require the removal of contaminated soil and water from the subsurface formation, treatment of such soil and water in aboveground facilities, and re-introduction of the decontaminated water and soil into the subsurface formation. Above-ground methods have been found to be effective but extremely expensive, especially where the subsurface contamination is widespread.

For this reason, in situ methods are preferred wherever possible. In almost all in situ methods, contaminated liquids and vapors are withdrawn from a contaminated zone within the subsurface formation via one or more extraction wells. Typically, the contaminated liquids are pumped from the bottom of the extraction well, and the contaminated vapors are removed from the extraction well under vacuum. After removal from the extraction well, these two fluid streams (contaminated liquids and contaminated vapors) are typically treated in separate treatment facilities.

One problem experienced with such in situ processes arises from the large capital and operating expenses of the separate treatment facilities for the contaminated vapor and contaminated liquid streams.

Accordingly, there is a need for an in situ subsurface decontamination method wherein the costs of treating the extracted contaminated vapor and contaminated liquid streams are minimized.

SUMMARY

The invention satisfies this need. The invention is a process for removing organic contaminants from subsurface formations comprising the steps of (a) injecting steam into the subsurface formation via an injection conduit, (b) removing a liquid stream from the subsurface formation via a liquid recovery conduit, (c) removing a vapor stream from the subsurface formation via a vapor recovery conduit, the vapor stream comprising both condensible vapors and non-condensible vapors, (d) combining the liquid stream and the vapor stream to create a combined stream and cooling the combined stream in a heat exchanger so that substantially all of the condensible vapors are condensed to condensed liquids, the condensed liquids being combined with the ground water liquid stream to form a combined liquid stream, and (e) separating the non-condensible vapors from the combined liquid stream.

DRAWINGS

These features, aspects and advantages of the present invention will become better understood with regard to the following description, appended claims and accompanying figures where:

FIG. 2 is a diagrammatic view of additional apparatus useful in the invention.

DETAILED DESCRIPTION

Figure 1:
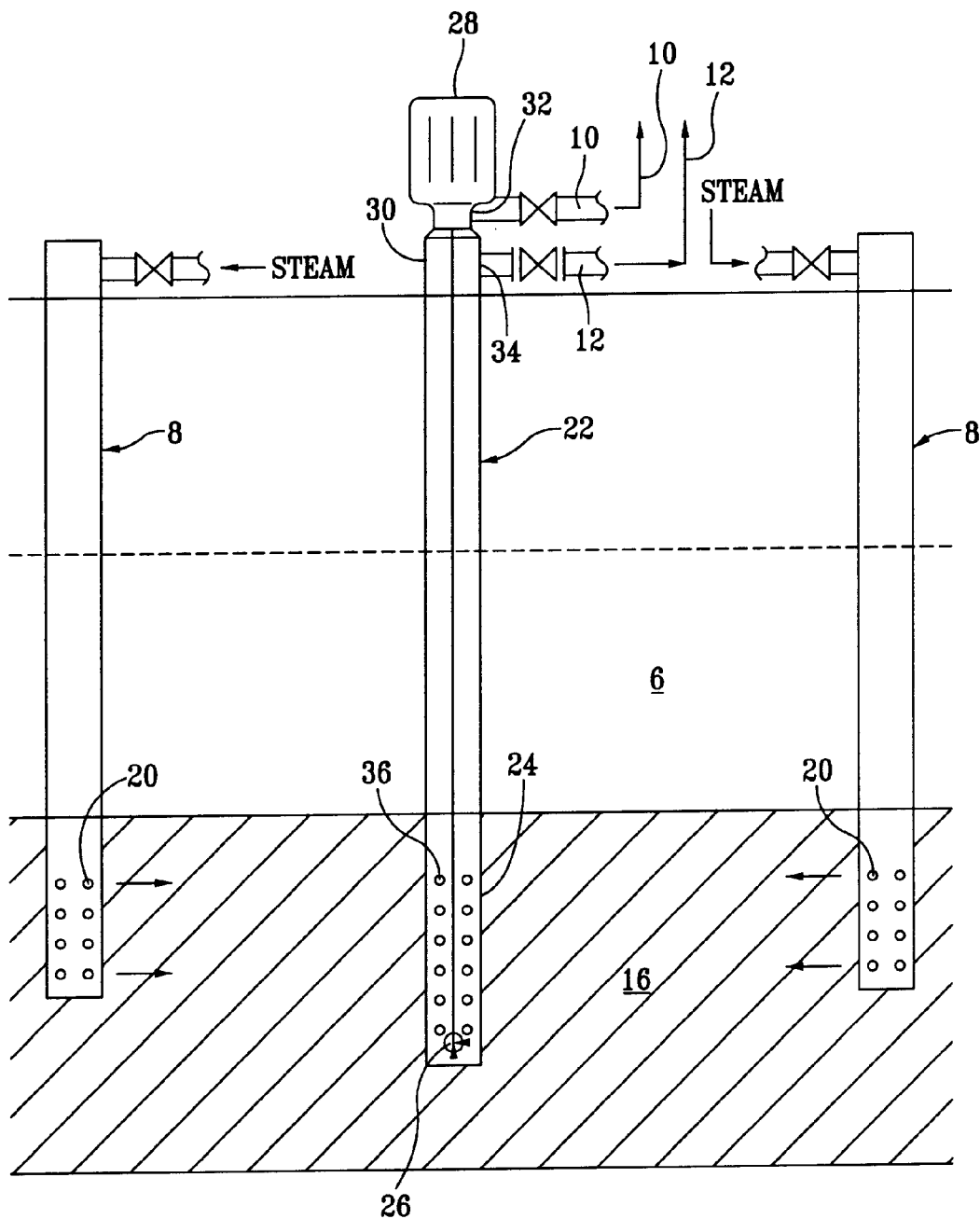
FIG. 1 is a diagrammatic view of apparatus useful in the invention.

The following discussion describes in detail one embodiment of the invention and several variations of that embodiment. This discussion should not be construed, however, as limiting the invention to those particular embodiments. Practitioners skilled in the art will recognize numerous other embodiments as well.

The invention is a continuous process for removing organic contaminants from the subsurface formation 6 comprising the steps of (a) injecting steam into the subsurface formation 6 via one or more injection conduits 8, (b) removing a liquid stream from the subsurface formation 6 via one or more liquid recovery conduits 10, (c) removing a vapor stream from the subsurface formation 6 via one or more vapor recovery conduits 12, the vapor stream comprising both condensible vapors and non-condensible vapors, (d) combining the liquid stream and the vapor stream to create a combined stream and cooling the combined stream in a heat exchanger 14 so that substantially all of the condensible vapors are condensed to condensed liquids, the condensed liquids being combined with the liquid stream to form a combined liquid stream, and (e) separating the non-condensible vapors from the combined liquid stream.

As illustrated in FIGS. 1 and 2, steam is injected into a contaminated zone 16 within a subsurface formation 6 via one or more injection conduits 8. Typically, a plurality of injection conduits 8 are disposed around the perimeter of the contaminated zone 16 within the subsurface formation 6. One or more injection conduits 8 can also be disposed within, immediately below or immediately above the contaminated zone 16. The injection conduits 8 are typically vertical conduits made from steel or other suitable meal. A typical inside diameter of the injection conduit 8 is between about 4 inches and about 16 inches. The injection conduits 8 are generally perforated with perforations 20 at their lower ends to allow the flow of steam out of the injection conduits 8 and into the subsurface formation 6.

The injection of steam into the subsurface formation 6 heats the contaminated zone 16 and the contaminants contained therein. The heating of the contaminants and, in some cases, the additional pressure applied to the contaminants, by the injected steam tends to mobilize the contaminants. The mobilized contaminants are then removed from the subsurface formation 6 by one or more extraction conduits 22. Each such extraction conduit 22 is typically a vertical conduit disposed within or slightly above the contaminated zone 16. Each extraction conduit 22 is perforated near its lower end 24 to allow the flow of mobilized liquids and vapors into the extraction conduit 22. Typically, a liquid extraction pump 26 is disposed in the bottom of the extraction conduit 22 to pump liquids within the lower end 24 of the extraction conduit 22 to the surface. As illustrated in FIG. 1, such liquid extraction pump 26 is typically powered by a pump motor 28 disposed at the upper end 30 of the extraction conduit 22. Liquids pumped to the upper end 30 of the extraction conduit 22 are then removed from the extraction conduit 22 via a liquid extraction port 32 and the liquid recovery conduit 10.

The liquid extraction port 32 is disposed in the upper end 30 of the conduit 22. Also disposed in the upper end 30 of each extraction conduit 22 is a vapor extraction port 34 through which vapors (which enter the conduit 22 via the perforations 36 at the bottom of the conduit 22) flow from the conduit 22 to the vapor recovery conduit 12.

In the invention, instead of treating the liquid stream (within the liquid recovery conduits 10) and the vapor stream (within the vapor recovery conduits 12) separately (as is done in the prior art), the liquid stream and the vapor stream are combined at a juncture point 38 to create a combined stream. Downstream of the juncture point 38, the combined stream is then cooled in the heat exchanger 14 so that substantially all of the condensible vapors are condensed to condensed liquids. Those condensed liquids are then combined with the primary liquid stream to form a combined liquid stream.

Typically, the combined stream is cooled in a shell and tube heat exchanger as illustrated in FIG. 2. Thereafter, the combined stream flows into a knock-out drum 40 or other suitable separating device wherein the non-condensible vapors are separated from the combined liquids. The combined liquid stream is then withdrawn from the knock-out drum 40 via a liquid drain port 41, and the non-condensible vapors are withdrawn from the knock-out drum 40 via an overhead port 42.

Typically, a vacuum is drawn on all of the equipment illustrated in FIG. 2 by a suitable vacuum pump 44 disposed downstream of the knock-out drum 40.

In many applications, the liquid stream recovered from the liquid extraction port 32 will be of sufficiently high temperature to require pre-cooling before being combined with the vapor stream at the juncture point 38. In the apparatus illustrated in FIG. 2, such pre cooling is accomplished in a finned tube heat exchanger 46.

In a typical example, the temperature of the vapor stream removed from the vapor extraction port 34 is between about 50° C. and about 150° C., and the liquid stream removed from the liquid extraction port 32 has a temperature between about 60° C. and about 99.9° C. After pre cooling, the temperature of the liquid stream is reduced to between about 20° C. and about 50° C. After the vapor stream and the liquid stream are combined at the juncture point 38, the temperature of the combined stream (upstream of the heat exchanger 14) is typically between about 50° C. and about 70° C. In the heat exchanger 14, the combined stream is reduced in temperature to between about 45° C. and about 55° C.

The process has been found to provide substantial savings in both capital and operating expenses over systems of the prior art wherein the liquid and vapor streams are cooled in separate, distinct facilities.

Having thus described the invention, it should be apparent that numerous structural modifications and adaptations may be resorted to without departing from the scope and fair meaning of the instant invention as set forth hereinabove and as described hereinbelow by the claims.

What is claimed is:

1. A continuous process for removing organic contaminants from a subsurface formation comprising the steps of:

(a) injecting steam into the subsurface formation via an injection conduit;

(b) removing a liquid stream from the subsurface formation via a liquid recovery conduit;

(c) removing a vapor stream from the subsurface formation via a vapor recovery conduit, the vapor stream comprising both condensible vapors and non-condensible vapors;

(d) combining the liquid stream and the vapor stream to create a combined stream and cooling the combined stream in a heat exchanger so that substantially all of the condensible vapors are condensed to condensed liquids, the condensed liquids being combined with the liquid stream to form a combined liquid stream; and (e) thereafter separating the non-condensible vapors from the combined liquid stream.

2. The process of claim 1 wherein the liquid stream removed from the subsurface formation in step (b) is pre-cooled before being combined with the vapor stream in step (d).

3. The process of claim 2 wherein the liquid stream is precooled in an air cooled heat exchanger.

4. The process of claim 1 wherein the combined stream is cooled in step (d) in a shell and tube heat exchanger.

5. The process of claim 1 wherein the liquid stream removed from the subsurface formation has a temperature between about 30° C. and about 160° C.

6. The process of claim 1 wherein the vapor stream removed from the subsurface formation has a temperature between about 90° C. and about 160° C.

7. The process of claim 1 wherein the temperature of the liquid stream immediately before it is combined with the vapor stream in step (d) is between about 25° C. and about 50°.

8. The process of claim 1 wherein the temperature of the vapor stream immediately before it is combined with the vapor liquid stream in step (d) is between about 50° C. and about 100° C.

9. The process of claim 1 wherein, after the liquid stream and the vapor stream are combined in step (b), and before the combined stream is cooled in the heat exchanger, the temperature of the combined stream is between about 35° C. and about 90° C.

10. The process of claim 1 wherein the separating of the non-condensible vapors from the combined liquid stream in step (e) is carried out in a vessel separate from the heat exchanger.

* * * * *